(12) United States Patent
Boon

(10) Patent No.: US 7,111,907 B2
(45) Date of Patent: Sep. 26, 2006

(54) SIDE DUMP TRAILER FOR PARTICULATE MATERIAL

(75) Inventor: Edwin Lynn Boon, Surrey (CA)

(73) Assignee: K-Line Trailers Ltd., Langley (CA)

( * ) Notice: Subject to any disclaimer, the term of this patent is extended or adjusted under 35 U.S.C. 154(b) by 0 days.

(21) Appl. No.: 11/024,416

(22) Filed: Dec. 30, 2004

(65) Prior Publication Data

US 2005/0248208 A1    Nov. 10, 2005

Related U.S. Application Data

(60) Provisional application No. 60/533,223, filed on Dec. 31, 2003.

(51) Int. Cl.
  *B60P 1/04*    (2006.01)
(52) U.S. Cl. ....................................... 298/18
(58) Field of Classification Search .................. 298/18, 298/17 R, 19 R, 22 R, 22 J, 22 P, 23 R, 298/23 MD, 23 M, 23 S, 23 D
  See application file for complete search history.

(56) References Cited

U.S. PATENT DOCUMENTS

| 803,470 A | 10/1905 | Cope |
| 1,897,175 A | 2/1933 | Meyer |
| 2,284,661 A | 6/1942 | Joy |
| 2,471,874 A | 5/1949 | Johns |
| 3,616,950 A | 11/1971 | Coons |
| 4,049,137 A | 9/1977 | Meyer |
| 4,430,038 A | 2/1984 | Rempel et al. |
| 4,826,386 A | 5/1989 | Corompt |
| 5,454,625 A * | 10/1995 | Christensen et al. .......... 298/18 |
| 5,480,214 A | 1/1996 | Rogers |
| 5,580,211 A * | 12/1996 | Mengel ...................... 414/812 |
| 5,588,711 A | 12/1996 | Hall |
| 6,206,477 B1 * | 3/2001 | Rexus et al. ........... 298/23 MD |
| 6,626,498 B1 | 9/2003 | Ostermeyer |
| 6,708,537 B1 * | 3/2004 | Eschweiler et al. ........... 70/208 |
| 6,883,855 B1 * | 4/2005 | Chverchko et al. .... 296/100.09 |

FOREIGN PATENT DOCUMENTS

JP        55136627        10/1980

* cited by examiner

*Primary Examiner*—H Gutman
(74) *Attorney, Agent, or Firm*—Oyen Wiggs Green & Mutala

(57) ABSTRACT

A side-dumping trailer in which the load is dumped through one side of the trailer box by opening one side of the trailer box and subsequently tilting the entire box. The side is opened by moving the entire vertical side of the trailer box upwardly away from the load on hinged arms. A method of unloading a particulate load from a truck and side-dumping trailer by jack-knifing the trailer, opening the side of the trailer box, tilting the entire trailer box and then driving the truck forward.

11 Claims, 7 Drawing Sheets

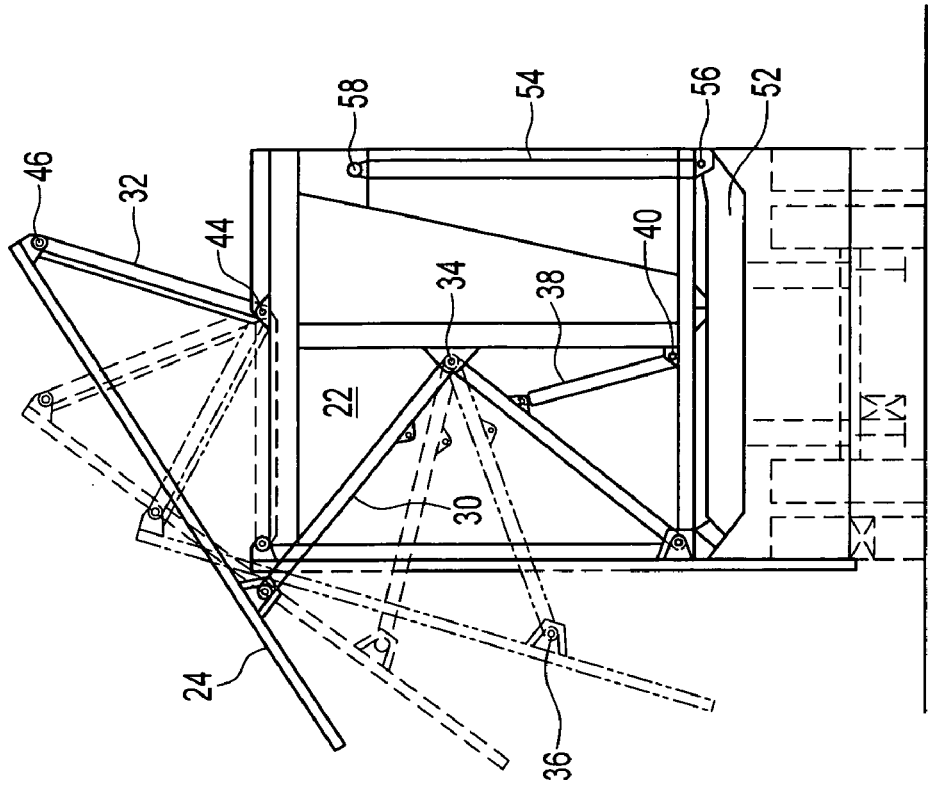
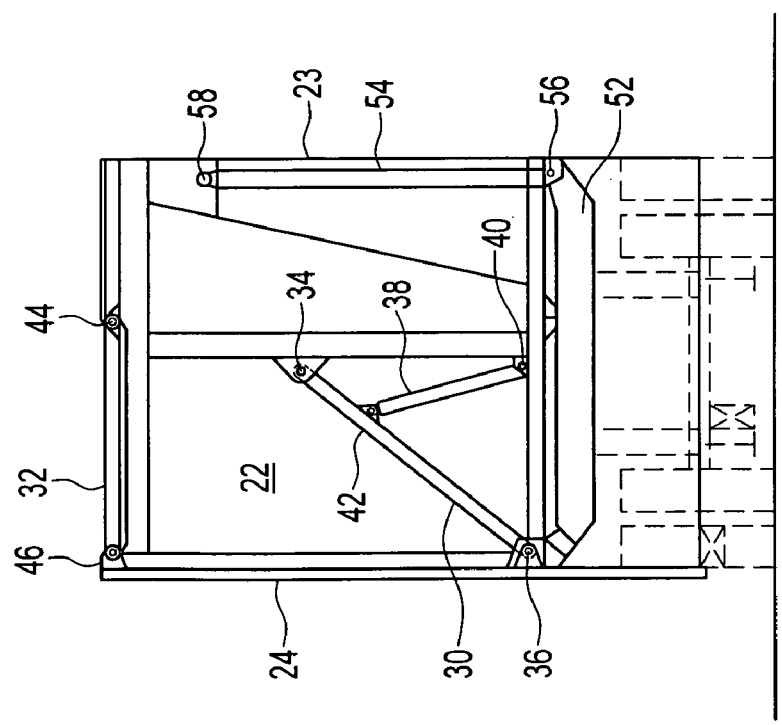
FIG. 2
FIG. 3

1

SIDE DUMP TRAILER FOR PARTICULATE MATERIAL

REFERENCE TO RELATED APPLICATION

This application claims priority from U.S. provisional application No. 60/533,223 filed Dec. 31, 2003.

TECHNICAL FIELD

The invention relates to the field of vehicles for hauling materials, and more particularly to vehicles for hauling particulate material having side dumping facility.

BACKGROUND

Side dumping trailers have previously been used, particularly in mining and agricultural applications for ease of unloading certain materials especially particulate materials. See U.S. Pat. No. 5,480,214 Rogers. Typically the dump box is open at the top for loading and unloading and the dump box is pivoted about a longitudinal axis below the box to dump the material over the top side edge of the dump box. A problem with such configurations is that in order to fully dump materials the side walls of the dump box are tapered rather than extending vertically from the bottom surface. The potential volume of the load is therefore reduced. Another problem with previous side dumping trailers is that the materials cannot be dumped far enough away from the side of the trailer to avoid interference with the movement of the trailer.

For applications such as transporting loads such as hog fuel or wood chips which are high volume but relatively light, it is important to maximize the volume of the trailer to make transport of such material economical while allowing for ease of loading and unloading. Live floors can be used for such applications but cannot be used with B-train trailers. There is therefore a need for a high-volume side dumping trailer for particulate materials.

SUMMARY OF INVENTION

The invention provides a side-dumping trailer in which the load is dumped through one side of the trailer box by opening one side of the trailer box and subsequently tilting the entire box. According to one aspect of the invention the side is opened by moving the entire vertical side of the trailer box upwardly away from the load. According to a further aspect the lower edge of the opening side has sealing latches to secure the side in the closed position during transport. The invention also provides a method of unloading a particulate load from a truck and side-dumping trailer by jack-knifing the trailer, opening the side of the trailer box, tilting the entire trailer box and then driving the truck forward.

BRIEF DESCRIPTION OF DRAWINGS

In drawings which disclose a preferred embodiment of the invention:

FIG. 2 is an end view of the trailer shown in FIG. 1 incorporating the invention with the hinged side in the closed position;

FIG. 3 is an end view of the trailer shown in FIG. 1 incorporating the invention with the hinged side in the open position, with intermediate positions shown in dotted outline;

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
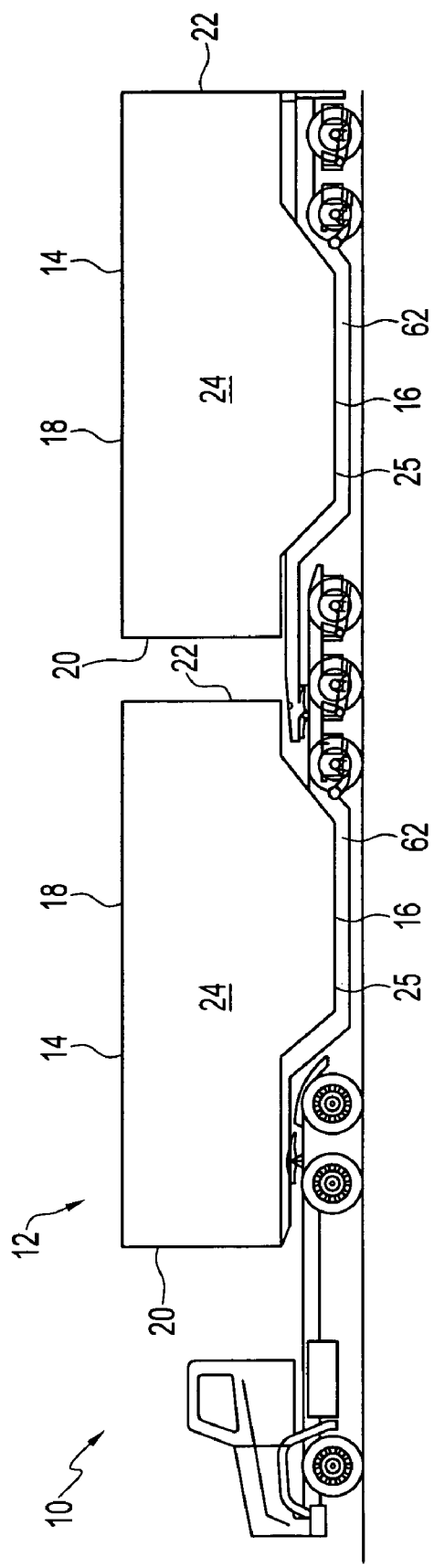
FIG. 1 is a side elevation view of a truck and trailer incorporating the invention.

With reference to FIG. 1, a truck 10 has a B-train trailer 12 comprising two side-dumping trailers 14 according to the invention. While a preferred embodiment of the invention is incorporated into two trailers such as A-train or B-train to maximize the volume, the invention will also have application to simple trailers, full trailers or semi-trailers with one trailer. In the preferred form of the invention the trailers 14 have "possum" floors 16 to maximize the volume. Each trailer has top 18, front end wall 20, rear end wall 22, closed side wall 23 and opening side wall 24. Preferably front end wall 20, rear end wall 22, and closed side wall 23 are formed of hollow-core aluminum extrusion panels. Opening side wall 24 is provided with more rigidity while retaining lightness by constructing it as a composite of high tensile steel bolted to aluminum. Top 18 may be open but preferably is closed by a mesh or solid tarp 80 to prevent material from blowing out. The tarp may be a standard roll tarp as used on chip vans and trailers or a flip tarp or tarp frame.

With reference to FIGS. 2–5, side hinged wall 24 is supported at both ends on lower hinged arms 30 and upper hinged arms 32. Lower arms 30 are pivotally connected to the frames of end walls 22 at 34 and are pivotally connected to the edges of side 24 at 36. Hydraulic cylinders 38 are pivotally connected at their lower ends to the trailer frame at 40 and are pivotally connected to arms 30 at 42. Upper arms 32 are pivotally connected to the frame of end walls 22 at 44 and are pivotally connected to the edges of side 24 at 46. As shown in FIG. 3, activation of hydraulic cylinders 38 raises side 24 from the closed position shown in FIG. 2 to the open position shown in FIG. 3.

Figure 4:
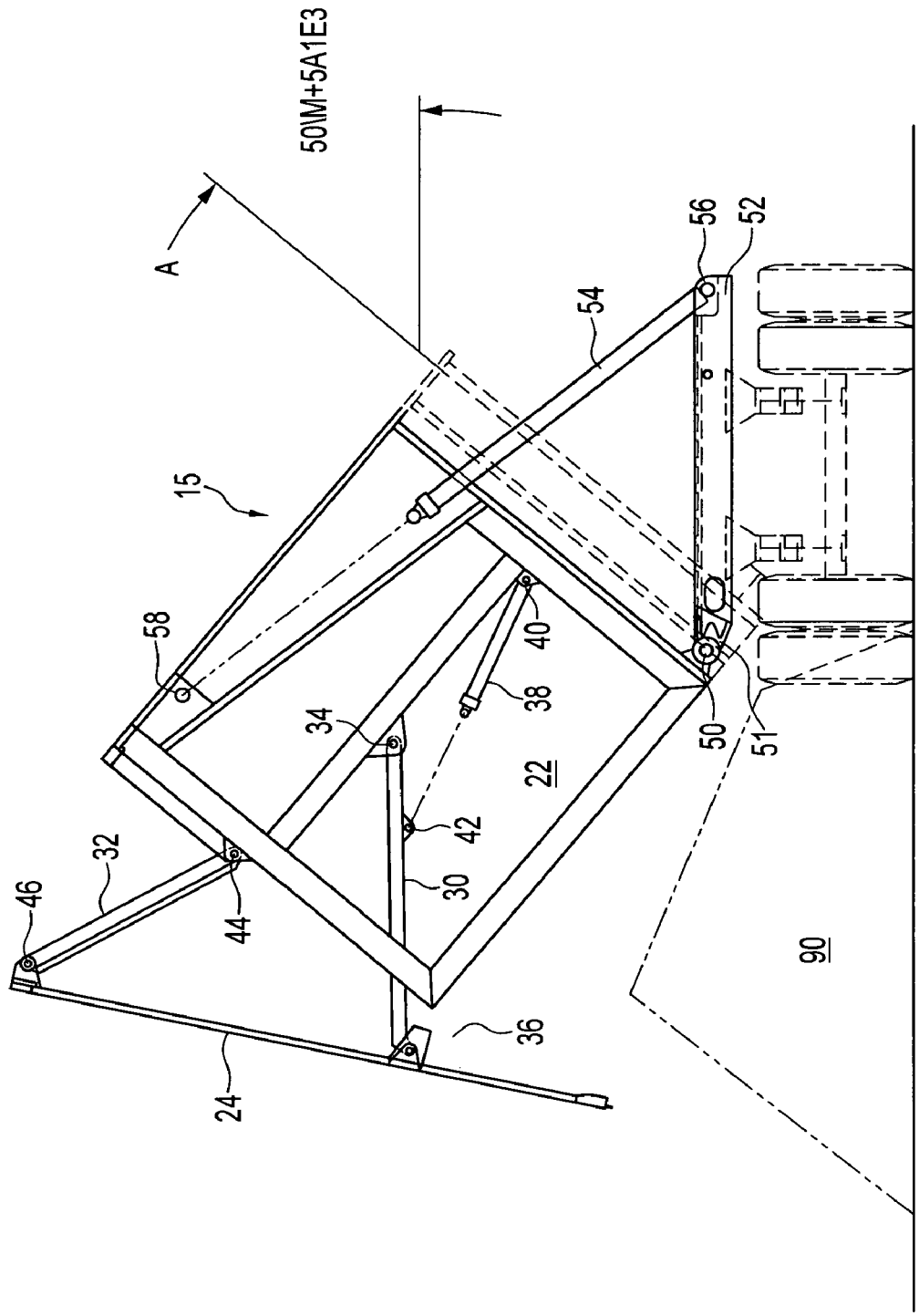
FIG. 4 is an end view of the trailer shown in FIG. 1 incorporating the invention with the hinged side in the open position, and the box tilted for dumping.
Figure 5:
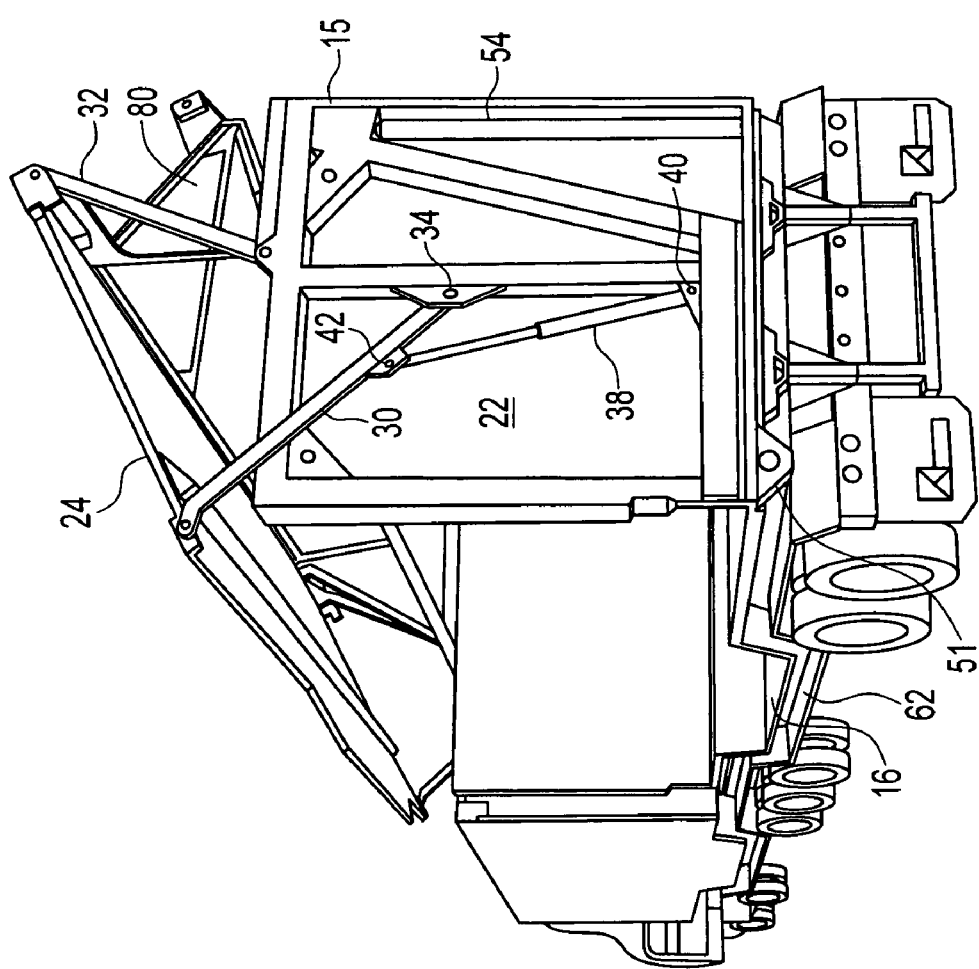
FIG. 5 is an end perspective view of the trailer shown in FIG. 1 incorporating the invention with the hinged side in the open position.

With reference to FIG. 4, the trailer box 15 is hingedly connected at both ends at 50 to trailer end frames 52. The hinges 50 are formed in steel outriggers 51 secured to the frames 52. Hydraulic cylinders 54 are pivotally connected at their lower ends 56 to the trailer end frames 52 and are pivotally connected to the trailer box 15 at 58. As shown in FIG. 4, activation of hydraulic cylinders 54 tilts box 15 from the transport position shown in FIG. 2 to the dumping position shown in FIG. 4. The preferred maximum angle A of tilt for dumping is about 50 degrees from horizontal.

Figure 9:
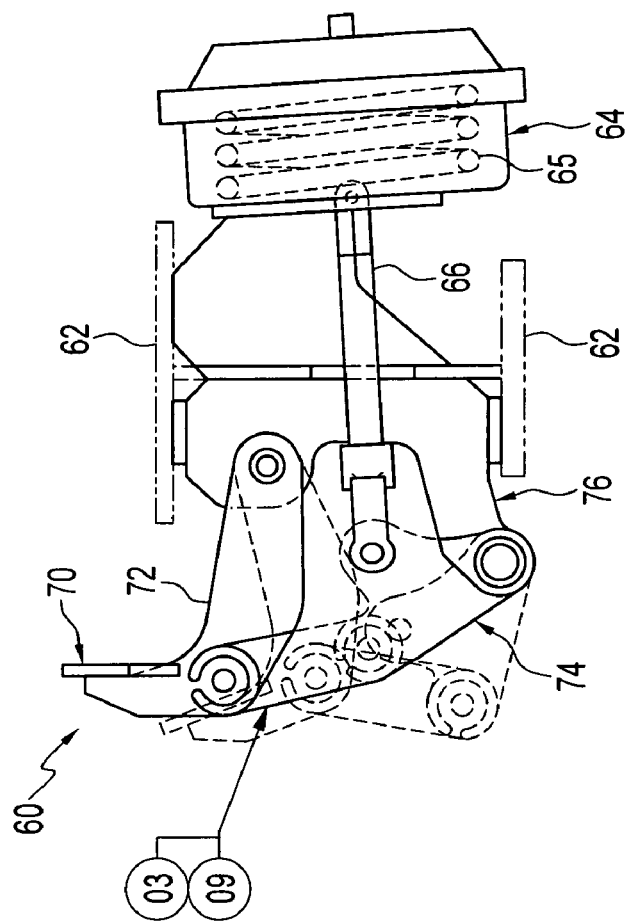
FIG. 9 is a side view of the lower latch for the hinged side of the invention.
Figure 8:
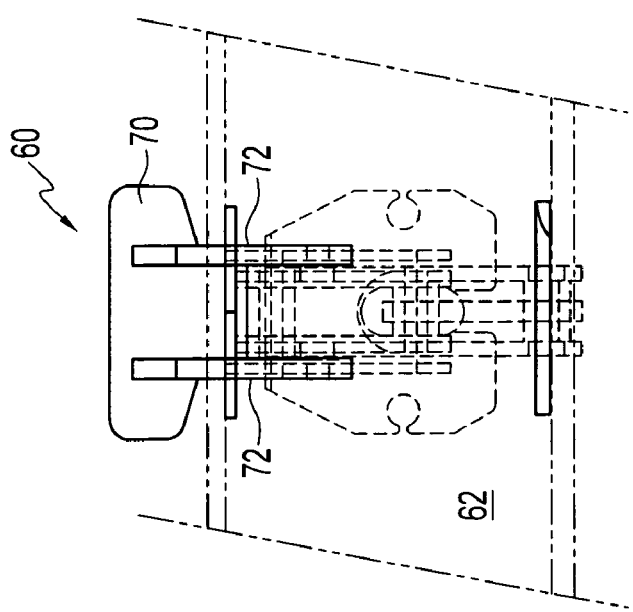
FIG. 8 is a front elevation view of the lower latch for the hinged side of the invention.

When hinged sides 24 are in the closed position for transport, they are tightly sealed along their lower edges by a number of powered paddle latches 60 as shown in FIG. 8–9. Preferably about 5 to 7 of these paddle latches 60 are spaced along lower edge 25, mounted on lower box rail 62. FIGS. 8 and 9 show the latch in the closed position, with the open position shown in FIG. 9 in dotted outline. Pad 70 is hinged on arms 72. Arms 72 are hingedly connected to intermediate arm 74 which in turn is hingedly connected to rod 66 and is hinged on support 76. A pneumatic or hydraulically powered cylinder 64 extends rod 66 to open the latch to free side 24 for opening. When power is released from cylinder 64, spring 65 withdraws rod 66 and pad 70 is pressed tightly against lower edge 25.

Figure 6:
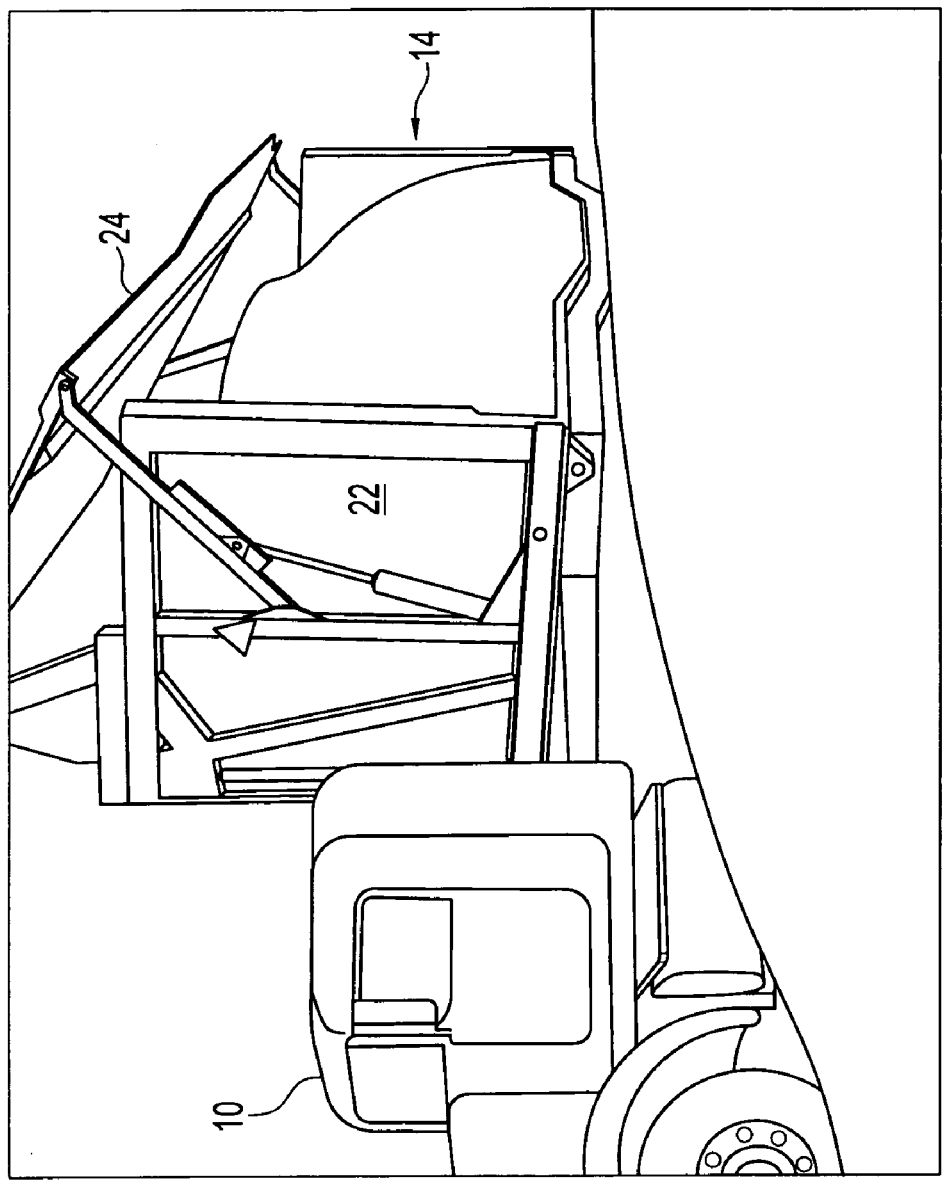
FIG. 6 is a perspective view of the trailer shown in FIG. 1 incorporating the invention with the hinged side in the open position and the truck jack-knifed for unloading.
Figure 7:
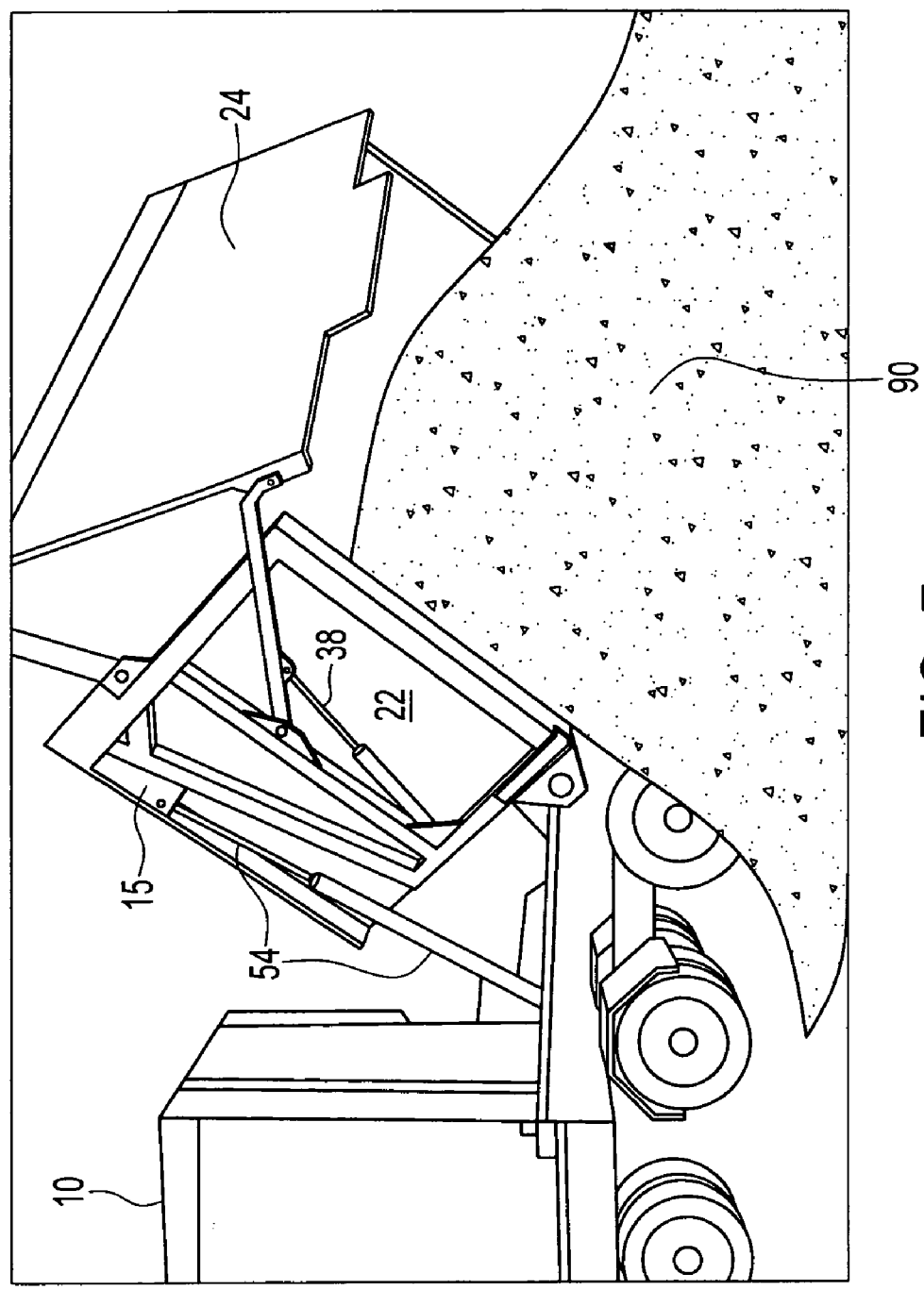
FIG. 7 is a perspective view of the trailer shown in FIG. 1 incorporating the invention with the hinged side in the open position and the truck jack-knifed for unloading and the box tilted for dumping.

Each trailer box 15 is loaded with hydraulic cylinders 38 and 54 in retracted positions, whereby side 24 is closed, and latches 60 are closed against lower edge 25. Where a tarp is used to cover top 14, in the case of a roll tarp the tarp is rolled open, or in the case of a frame tarp the frame is opened. The load of particulate material then flows into the interior of box 15 through top 14 to the desired level and the tarp is closed and tied down with restraining devices if applicable. The retraction of cylinders 54 will secure the boxes 15 in horizontal position for transport, although they may also be provided with automatic locking valves to lock the boxes 15 in horizontal position. To unload the trailers, preferably a remote control is used to activate the hydraulic or pneumatic cylinders. Where there is not an elevated dumping station, the driver jack-knifes the truck as shown in FIG. 6. Cylinders 64 are remotely activated to release paddle latches 60 and free sides 24. Cylinders 38 are then activated to open sides 24 to the fully open position as shown in FIG. 6. Cylinders 54 are then remotely activated to tilt boxes 15 and dump the load as shown in FIG. 7. The truck driver then moves the truck forward away from the dumped load 90 until fully dumped. Cylinders 54, 38 and 64 are then retracted to fully close the boxes 15 and the dump has been completed.

To facilitate the flow of particulate material during unloading, in the preferred embodiment the length of closed side 23 is about 4 inches shorter than side 24 to give the interior a slightly wedge shape.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A side-dumping trailer comprising:
   a) a trailer frame having first and second sides;
   b) a load-containing trailer box having first and second ends, first and second sides, a top and a bottom and power operated means for raising and lowering said first side of said trailer box, said trailer box being hingedly mounted along a bottom side thereof on said trailer frame for pivotable movement about a lengthwise axis extending generally parallel to said first side of said trailer frame, wherein said first side of said trailer box is mounted on hinged arms and is adapted to be pivoted from a first closed position for transporting a dumpable load to a second open position adapted for dumping said load wherein said first side of said trailer box is raised above said trailer box;
   (c) power operated means for reversibly tilting said trailer box on said trailer frame about said longitudinal axis from an upright transport position to a tilted dumping position;
   wherein the interior length of said first side of said trailer box is slightly longer than the interior length of said second side of said trailer box to facilitate the unloading of said trailer box when tilted.

2. The side dumping trailer of claim 1 wherein said top can be opened for loading said trailer box.

3. The side dumping trailer of claim 1 wherein said first side of said trailer box is mounted on two pairs of hinged arms, one pair being hingedly connected at their lower ends to the top edges of the first and second ends of said trailer box and at their upper ends to the edges of said first side of said trailer box, and the second pair being hingedly connected at their lower ends to the first and second ends of said trailer box at locations below said top edges of the first and second ends of said trailer box and at their upper ends to the edges of said first side of said trailer box.

4. The side dumping trailer of claim 1 wherein said first side of said trailer box is mounted on two pairs of hinged arms, one pair being hingedly connected at their lower ends to the top edges of the first and second ends of said trailer box and at their upper ends to the top corners of said first side of said trailer box, and the second pair being hingedly connected at their lower ends to the first and second ends of said trailer box at locations below said top edges of the first and second ends of said trailer box and at their upper ends to the bottom corners of said first side of said trailer box.

5. The side dumping trailer of claim 1 wherein the bottom of said trailer box is deeper in the central region thereof than at the ends thereof.

6. The side dumping trailer of claim 1 wherein said top of said trailer box is provided with a flexible, removable cover.

7. The side dumping trailer of claim 1 wherein said trailer box can be tilted to a maximum of 50 degrees from horizontal.

8. The side dumping trailer of claim 1 further comprising sealing latches secured to said first side of said trailer frame for bearing against the lower edge of said first side of said trailer box when in the upright transport position.

9. The side dumping trailer of claim 8 wherein said sealing latches are pivotally mounted paddle latches.

10. The side dumping trailer of claim 9 wherein said sealing latches are opened and closed by power operated means.

11. A truck and trailer combination comprising two side dumping trailers according to claim 1.

* * * * *